March 18, 1947.   A. L. M. A. ROUY   2,417,448
COOLING AN INTERNAL COMBUSTION ENGINE
Filed Nov. 25, 1944   4 Sheets-Sheet 1
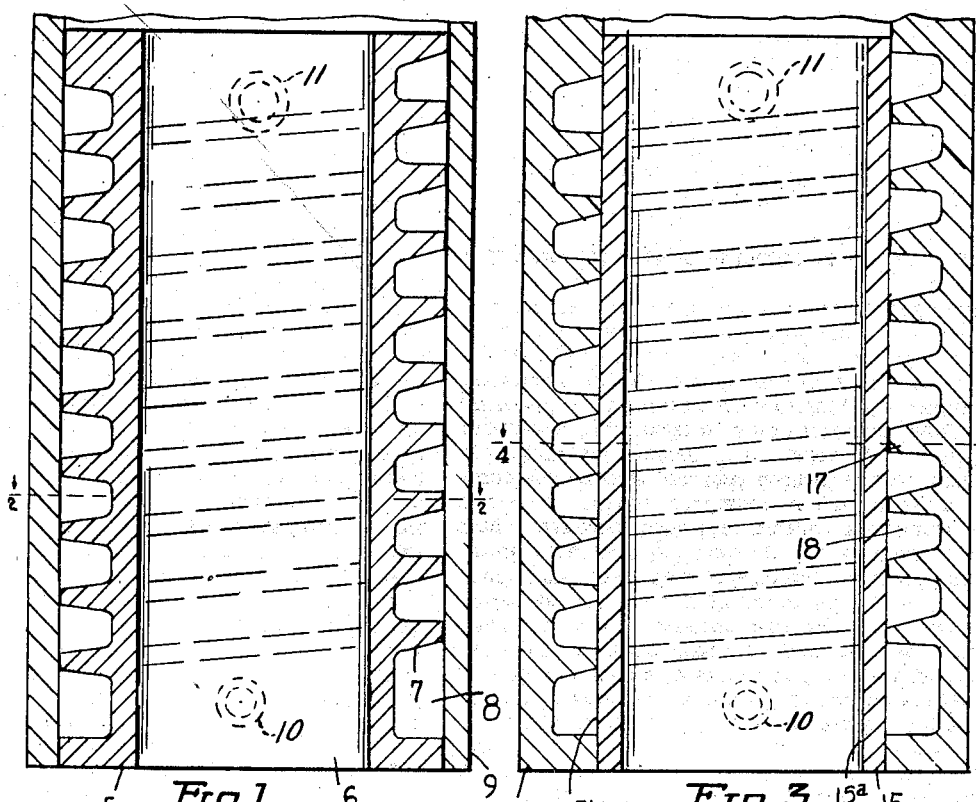
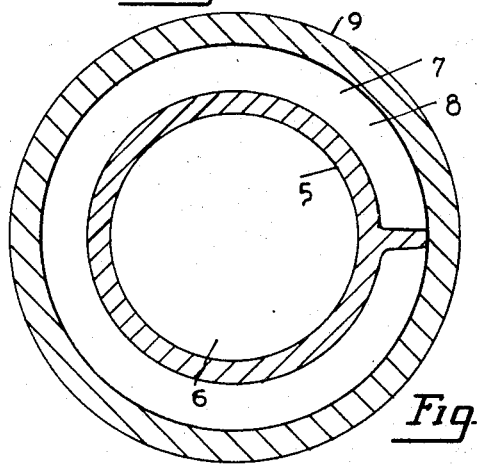
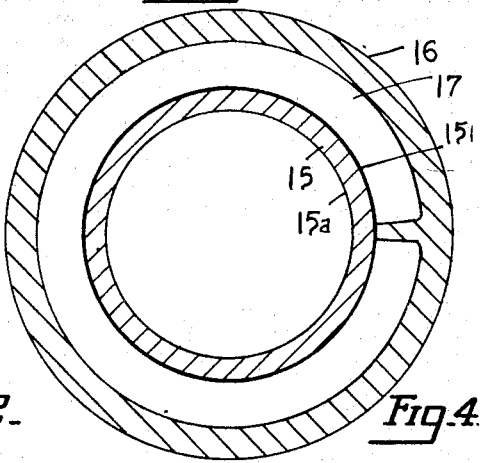
INVENTOR.
Auguste Louis Marie Antoine Rouy
BY
Carl Miller
ATTORNEY March 18, 1947.  A. L. M. A. ROUY  2,417,448
COOLING AN INTERNAL COMBUSTION ENGINE
Filed Nov. 25, 1944  4 Sheets-Sheet 2
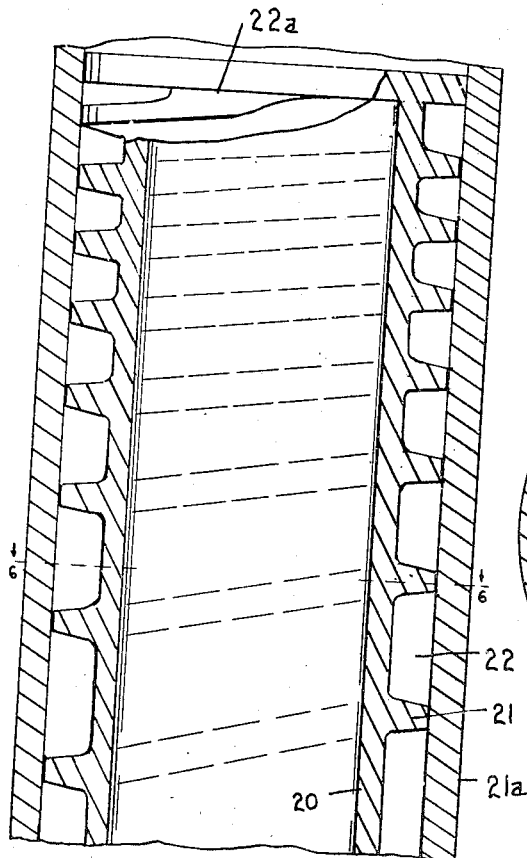
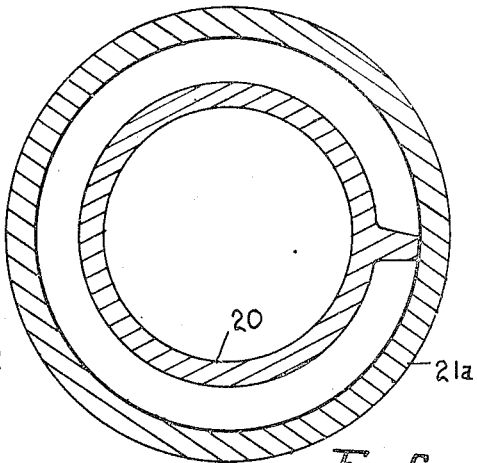
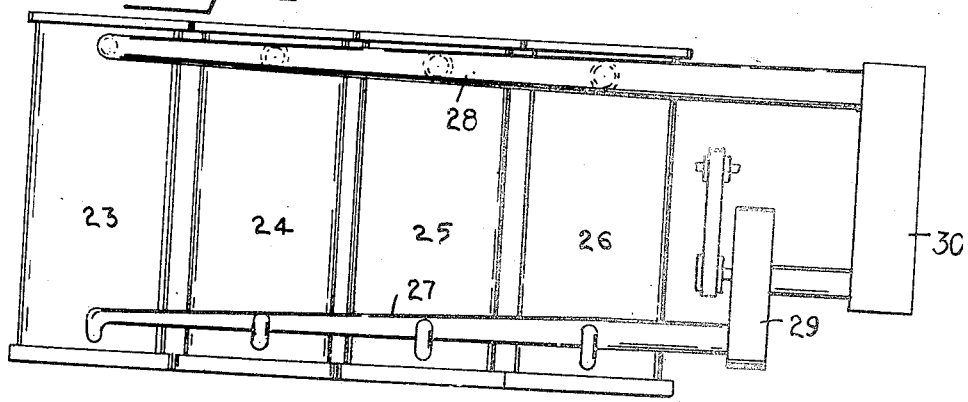
INVENTOR.
Auguste Louis Marie Antoine Rouy
BY
Carl Miller
ATTORNEY INVENTOR.
Auguste Louis Marie Antoine Rouy
BY Carl Miller
ATTORNEY Patented Mar. 18, 1947

2,417,448

UNITED STATES PATENT OFFICE 2,417,448

COOLING AN INTERNAL-COMBUSTION ENGINE

Auguste Louis Marie Antoine Rouy, New York, N. Y.

Application November 25, 1944, Serial No. 565,146

14 Claims. (Cl. 123—173)

This invention relates to a cooling system for internal combustion and explosion engines, and one of its objects is to provide a system for progressively cooling the engine cylinder walls from the bottom upwardly, as the temperature in the engine cylinder rises toward the top of the cylinder, as a result of the adiabatic expansion of the burned gases.

Internal combustion and explosion engines have been carried to a high state of development, which has utilized and even promoted the discovery of better steels and alloys, more skillful tooling micromatic surface finishing, high statical and dynamical balancing, more responsive ignition methods, better fuel charging and finer types of fuel, developed and utilized with enclosed combustion and resulting in ever higher working temperatures and pressures. In this development it has been found that limits to the generation of power are significantly influenced by the limits imposed by the cooling system, in holding the engine walls and head to safe temperature limits. Efforts have been made to substitute special cooling mediums or fluids for water, or to combine special ingredients with water, but these efforts have failed to develop the cooling efficiency of existing internal combustion engines and explosion engines, so that further mechanical engine development may result.

Various considerations of space, weight, control and service have conditioned the use of higher operating speeds with internal and explosive combustion engines, but further development calls for better engine cooling methods and structural details.

All existing methods and means for cooling internal combustion and explosion engines are inadequate to serve the developments made and being made in higher speed and higher powered engines. These methods not only fail to provide sufficient cooling for the advanced types of engines, but fail to uniformly cool internal combustion and explosion engines, with the result that there is a non-homogenous thermal expansion of the engine cylinders producing distortion and irregular stresses repartition, which distorts the true circular form of the engine cylinders, causes leakage of fuel charges into the crank case and leakage of lubricating oil from the crank cases into the combustion chambers, and a serious loss of compression, with consequent reduction in power output.

Internal combustion engines operating at high speed subject their exhaust valves to intense heating, as the hot gases generated by combustion must flow through the exhaust valve seat and against the exhaust valve. The flow passage thus afforded is extremely narrow, and the discharging gases must flow at very high velocities through the valve seat and against the exhaust valve, and this results in a nearly proportional increase in the heat transfer rate between the gases and the surfaces of the exhaust valve and its seat, producing a corresponding increase of the surface temperature unless appropriate means of increasing the heat transfer rate between the walls and the cooling fluid are secured avoiding therefore the possibility of developing dangerously high temperature deteriorating the vital surfaces of valve and valve seat.

An object of the present invention is to provide means for circulating progressively or not the cooling water or fluid around the cylinder wall of the engine, in an ascending spiral path, so that the velocity of the cooling water or other medium employed is progressively increased or kept at a constant value depending on the cooling duty to secure from the bottom of the engine cylinder upwardly to the head thereof, to facilitate an homogenous transfer of the heat generated in the engine cylinder to the cooling medium, this spiral ascending flow of the cooling medium being accomplished by means of spiral fins which are integral with the cylinder lining or with the water jacket wall of the cylinder, and which thus present to the flowing water a greater outside surface, its density repartition per unit surface of the cylinder being easily controlled, while the heat transfer rate between the same outside walls and the cooling medium is kept homogenous or varies in function of the duty imposed by the local inside temperature.

The transfer of engine heat to the cooling water takes place as a result of the flow of the cooling water against the external face of the engine wall. In this manner the velocity of the flow of the water or cooling medium against the cylinder walls acts upon the heat transfer rate per unit of surface, as the power of .8 of the same velocity. In the same manner the total heat transferred varies proportionately with the relative density of the cylinder external surface, in respect with the internal surface of the cylinder, and the mean logarithmic temperature difference between the surface and the cooling medium. Thus it will be seen that the total amount of water or cooling medium varies with the velocity which is proportional to the speed of the engine, due to the circulating pump driven by it. By my method I realize automatically a constant temperature difference, at all speeds of the engine, and thereby avoid deformation of the engine walls, with the result that the engine is maintained at its highest working efficiency.

Using an engine having a cylinder with a six inch bore and a piston stroke of six inches, I have been able to realize a total cooling duty varying from 10,000 to 350,000 B. t. u.s per hour with a practically constant temperature difference between the engine surfaces and the cooling fluid.

By varying the pitch of the spiral fins, by decreasing the pitch from the bottom to the top of the cylinder, I secure an increasing velocity of the cooling water or fluid, and increase the relative outside surface in the same manner therefore securing a heat transfer rate and a surface density such that I can fulfill the cooling duty which increases from the bottom to the top of the engine cylinder and thereby secure a cylinder wall having constant temperature.

An object of the present invention is to develop the exposed external surface of the engine subjected to direct physical contact with the cooling water, without changing the total weight of the engine or its bulk, and at the same time reinforcing the engine walls by external reinforcement by the cooling fins or ribs, which also serve to transmit the transversal mechanical stresses to the water jacket walls by direct mechanical or physical contact therewith.

In the present practice of designing cooling jacket spaces, provision is made for ample room, which involves ample capacity for the required amount of water, according to the low rate of heat transfer which prevails under these conditions. Under these conditions the cooling water does not flow with uniform velocity, and a cross sectional study of the cooling water will show considerable differences in temperature for different distances from the engine walls. In my present invention the circulation of the cooling water is not only caused to take a spiral path around the engine cylinder but to spin in its own spiral path, due to the smaller frictional forces resulting from the lower viscosity coefficient of the cooling water or medium in contact with the hot surfaces of the engine, so that in my method heat is transferred to all particles of the cooling water more efficiently, due to the mixing action which develops from the different velocities of the water produced by the spiral flow and centrifugal influences generated, and to lower the friction forces generated between the particles of water flowing directly against the hot engine surfaces and forced thereby outwardly, thereby displacing the cooling particles of water from the outer position in the spiral stream.

With the above and other objects in view, the invention relates to certain combinations, features and parts of construction, arrangements of parts, and method steps, clearly described in the following specification, and fully illustrated in the accompanying drawings, in which—

Fig. 1 is a vertical sectional view through an engine cylinder, showing an engine lining formed with spiral external vanes, providing a spiral water cooling path.

Fig. 2 is a horizontal sectional view thereof, taken on line 2—2 of Fig. 1, looking in the direction of the arrows.

Fig. 3 is another vertical sectional view, showing another form of the invention, wherein the spiral cooling vanes are formed integral with the water jacket wall.

Fig. 4 is a horizontal sectional view, taken on line 4—4 of Fig. 3, looking in the direction of the arrows.

Fig. 5 is another vertical sectional view of an engine cylinder, showing an engine lining formed with integral cooling vanes arranged in a spiral of varying pitch around the engine lining.

Fig. 6 is a horizontal sectional view, taken on line 6—6 of Fig. 5, looking in the direction of the arrows.

Fig. 7 is a side elevation showing a group of engine cylinders and the intake and outlet manifolds for the water cooling systems thereof, and the usual radiator and water pump for the same.

Fig. 12 is a detail vertical sectional view thereof.

Figure 8:
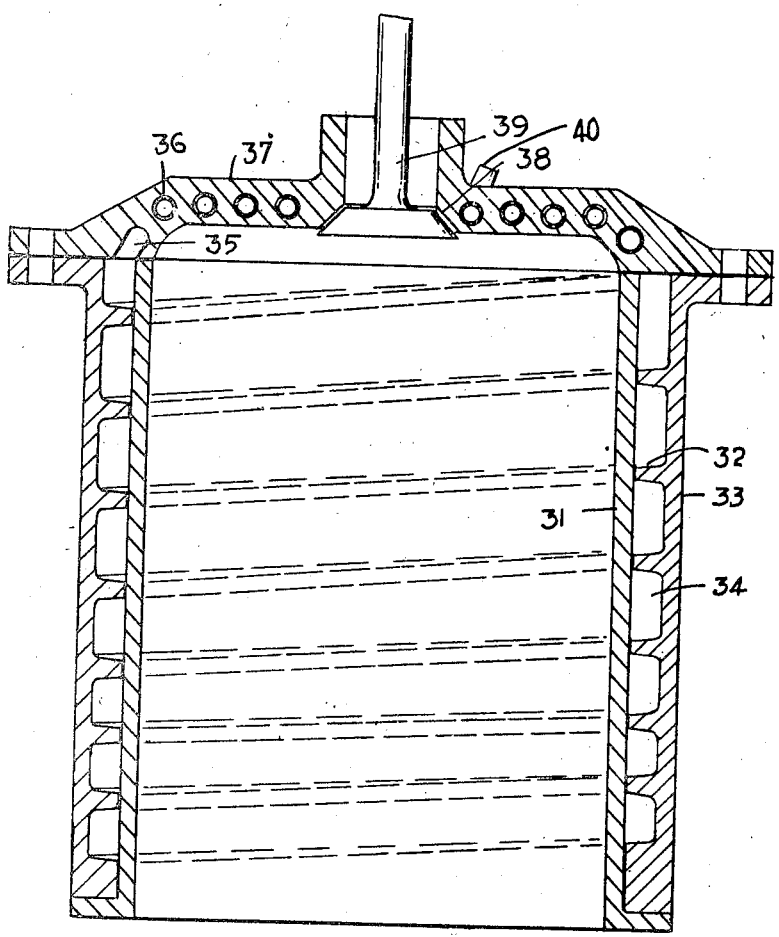
Fig. 8 is a vertical sectional view through an engine cylinder, showing an engine head having a helically coiled cooling pipe cast therein, and helical cooling vanes arranged on the water jacket wall.

Referring to the accompanying drawings, particularly to Figs. 1 and 2, 5 designates an engine cylinder lining, having the usual piston bore 6, and this lining is shown to be provided with integral spiral vanes or fins 7, formed with the outer wall surface of the cylindrical lining. This work may be completed by casting, or by milling or other tool cutting operations, and these spiral vanes or fins provide a helical water channel 8 between the same, which makes one or more complete turns around the wall of the lining. This channel is maintained by means of the water jacket wall 9, which is tightly fitted on the helical vanes or fins, by force fitting or otherwise. The lining and its helical vanes or fins and the water jacket wall are preferably constructed of the same kind of metal, which is usually a high grade of cast iron.

The helical or spiral vanes or fins 7 and the water channel 8 are arranged in constant pitches, and the cooling water flows through the intake 10, which is connected with the lower end of the water channel 8, through the spiral channel outlet 11, which is connected with the upper end of the channel 8, through the water jacket cylinder wall 9.

As the combustion of fuel develops in the cylinder, in the usual manner by equipment not here shown, heat is generated and the temperature of the engine cylinder lining rises accordingly. The burden of the cooling system increases proportionately, and by my invention the wall of the cylinder is extended through the cooling water, by means of the helical vanes or fins, so that far greater surface area of the cylinder is in direct physical contact with the cooling water.

The water in flowing through the helical channel spins constantly upon itself, due to the fact that the hotter particles of water, in consequence of the lowering of the viscosity coefficient, flow from the external surface of the engine lining and displace the colder particles of water near the internal surface of the water jacket cylinder or wall, and further due to the fact that the area of the water channel surface along the internal wetted surface of the water jacket wall and along the external surfaces of the spiral vanes, is considerably greater than the area of the surface of the engine lining between the spiral vanes, and this presents great differences in frictional resistance to the flow of water, and these differences in frictional resistance result in variations of filament velocity of the flowing water, which tends to increase the degree of spinning of the water stream flowing through the spiral channel.

The effect of this spinning motion of the cooling water is to bring all particles of the cooling water into flowing contact with the external surface of the engine cylinder. This effect greatly improves the efficiency of heat transfer from the engine to the cooling water, and serves to maintain the engine within limits of temperature rise found necessary to maintain a given engine at its maximum load and fueling.

In Figs. 3 and 4 I show an engine lining 15 provided with a smooth exterior surface 15a. and a smooth interior surface 15b, while the water jacket wall 16 is formed with integral spiral cooling vanes 17, either cast thereon or produced by milling or other machine tool cutting operation. These vanes 17 are arranged to provide a spiral water channel 18, which are shown to be disposed in a constant pitch.

In Figs. 5 and 6 another form of the invention is shown, wherein the engine cylinder or lining 20 is formed with integral vanes 21, which are cast thereon or produced by milling or other machine tool cutting operation, but which are disposed in varying pitch lines around the cylinder or lining 20, thus forming the spiral water channel 22, which decreases in area from the lower end thereof to the upper end thereof. The upper end of the vanes 21 are reinforced by the mass 21a, which distributes the stresses developed on the engine cylinder or lining and in the vanes over a wider area, thereby reducing the tendency to fracture under changes in the temperature gradient.

The heat transfer duty per unit of surface from the engine to the cooling water increases from the bottom to the top of the cylinder, and by using a water channel which is progressively reduced in cross sectional area, as it approaches the upper end of the engine, the spiral vanes are brought closer to each other, and the mass of metal exposed to the water is increased proportionately to the rise in the transfer duty of the engine upwardly.

In Fig. 7 I show a series of engine cylinders 23, 24, 25 and 26, connected to the intake manifold 27 at their lower ends and with the outlet manifold 28 at their upper ends. The intake manifold 27 is connected with the water pump 29, which receives its supply of water from the lower end of the conventional radiator 30, and the radiator receives its water supply from the outlet manifold 28—as in the usual practice.

Figure 9:
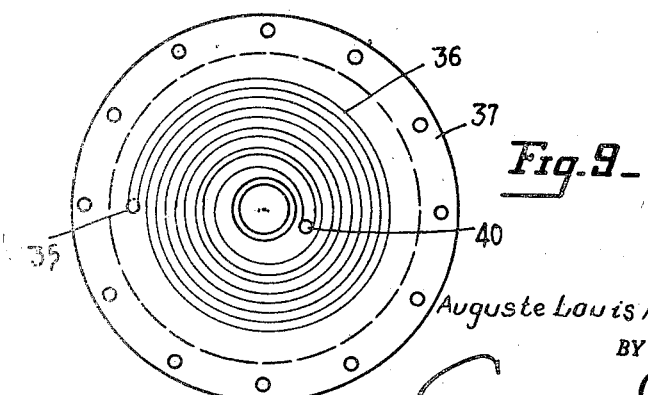
Fig. 9 is a plan view of the engine head, taken on a smaller scale, showing the helically coiled cooling pipe.

In Figs. 8 and 9 another form of the invention is shown, wherein the engine cylinder or lining 31 is provided with a smooth internal face and with a smooth external face and the spiral cooling vanes 32 are formed integral with the water jacket wall 33, by casting or tooling. The vanes 32 establish the spiral water channel 34, and the upper end of this channel is in communication with the intake end 35 of the water circulating pipe 36, which is cast in the head of the engine, indicated at 37. This head is shown to include the valve seat 38, which is closed by the valve 39, operated by means not shown.

The water circulating pipe 36 is shown to be arranged in an approximately horizontal spiral or helix around the valve seat, and includes the outlet end 40, which may be connected to any external water circuit of the engine system.

The cooling water flows from the spiral channel 34 through the helically coiled pipe 36, and thence through the usual external water circuit, and in this manner the engine head is progressively cooled.

Figure 10:
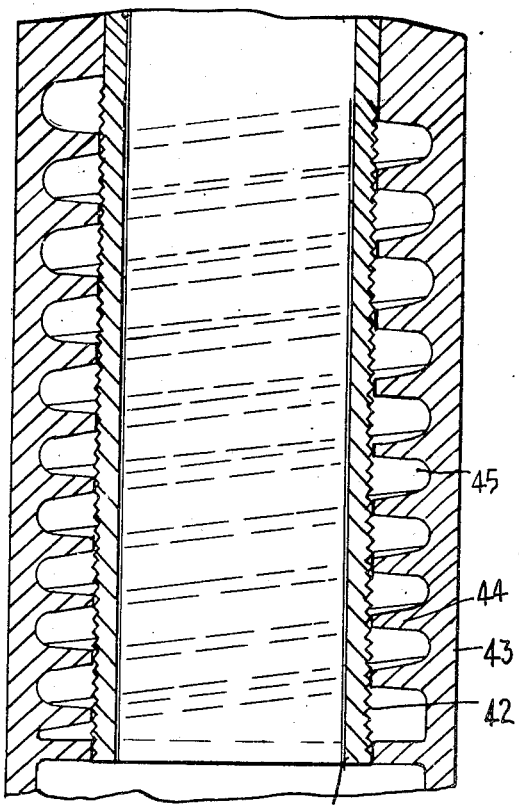
Fig. 10 is another vertical sectional view through an engine, showing an engine lining formed with helical screw threads and a water jacket wall formed with integral spiral cooling vanes, which cooperate with the screw threads or external ribs of the engine lining to present a great increase in normal surface area to the cooling water.

In Fig. 10 a further development of the cooling system is shown, wherein the engine cylinder or lining 41 is formed with external screw threads or ribs 42, and is provided with a water jacket wall 43, which is formed with internal and integral spiral cooling vanes 44, which are forced over the screw threads or ribs 42, so as to make good mechanical or physical contact therewith.

The cooling vanes 44 establish a water channel 45 which causes the cooling water to flow in an ascending spiral around the external screw threads or ribs 42, so that the total area of the surface exposed to the flowing cooling water is substantially increased, and the amount of heat transferred to the cooling water from the engine and for the same temperature difference, is proportionately increased.

Figure 11:
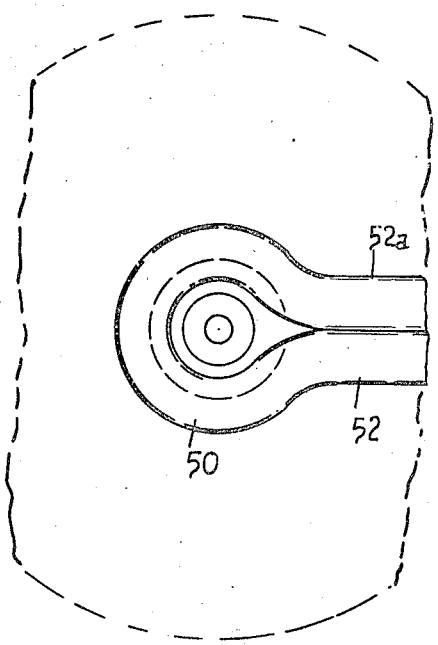
Fig. 11 is a detail view showing a cooling pipe arranged around the exhaust valve seat.
Figure 18:
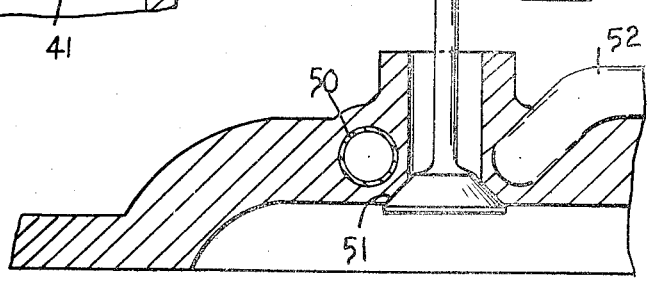

In Figs. 11 and 12 means for cooling the exhaust valve seat are developed, by the use of the water coil 50, which is cast in place around the position where the exhaust valve seat 51 is developed. The coil 50 has an end to form an inlet and the other end or outlet abutting in the head of the engine. By circulating the cooling water close to the valve seat of the exhaust valve 53, this valve and its seat will be kept from being overheated and thus interfering with the efficient operation of the engine.

The water in both types of the spiral water channels flows several times around the cylinder of the engine, the number of turns made depending in part on the size of the cooling vanes, their spacing or their pitch, the diameter of the engine cylinder, and other minor factors. The pitch or lead of the vanes in the main controls the number of turns made by the water channel established by the vanes. In this manner the cooling water thus progressively accumulates heat from the engine, causing its temperature to rise, and increasing its velocity of flow upwardly, and due to this fact it retains its capacity to transfer heat to establish a constant temperature for the engine cylinder wall.

In both forms of the invention, the engine cylinder is uniformly cooled, so that the internal surface of the engine cylinder, against which the power piston works, is not distorted out of a true circular form, and maximum fuel charging, compression, and scavenging functions are maintained, together with efficient sealing against leakage of the fuel into the crank case and of oil from the crank case into the combustion chamber, is obtained.

By preventing distortion of the engine cylinder, by providing homogeneous and equal cooling, thereby avoiding unbalanced overheating and overcooling, the force of the power stroke is maintained at its highest level of efficiency, fuel consumption is confined to the combustion service, and in design weight requirements may be more intelligently and conservatively determined.

This invention is the consequence of the necessity for securing a cooling of engine cylinder walls, in such manner that deformation of the cylinder walls, under the intense heat of combustion or explosion, will be avoided, and the cylinder walls will be maintained in their true circular shape, to insure maximum power strokes of the operating pistons, and minimum leakage of the fuel charges and of the lubricating oil.

This object can only be realized when every part of the cylinder wall is maintained at the same temperature. Due to the time intervals between the explosions or combustion cycles of internal combustion engines, the temperature of the gases of combustion in contact with the cylinder walls varies with the actual occupied volume, in other words with the piston displacement, and therefore with the density of the gases during the different phases of piston displacement; while the heat transmission from the gases to the cylinder walls is proportional to the temperature difference, in the case of heat transference by convection; and proportional to the 4th power of the temperature in the use of heat transference by radiation.

As a result of these physical causes the quantity of heat flowing through the cylinder walls of an engine varies considerably from the top to the bottom of the engine cylinder. In this same time the only way of transmitting the heat of combustion to the cooling fluid is through convection: the transmission of heat being only proportional to the temperature difference: therefore, to evacuate the heat of combustion through the engine cylinder walls, we should have a temperature difference increasing from the bottom to the top of the cylinder in a ratio of at least 1 to 10. The temperature of the cooling fluid varies only a few degrees and follows this increase from bottom to top of the cylinder, in a contrary direction. This physical condition can only be overcome if we change the heat-exchange rate, and the density of the contact surfaces between the cooling fluid and the cylinder walls.

My invention solves this completely, by changing the heat-transfer rate and the density of the contact surfaces accordingly with the heat-exchange duty.

Heat-exchange duty, is the amount of heat expressed in B. t. u. per unit of surface per unit of time, which must be transferred.

Contact surface density: is the ratio of the actual contact surface with cooling fluid to the unit of surface of the inside cylinder wall.

Heat-exchange rate of convection is proportional to the fluid velocity.

It is understood that various changes in the details of construction, in the method steps disclosed, and in the general combination and arrangement of parts, of construction details, may be varied within the limit of the claims of this application.

Having described my invention I claim as new:

1. The method of cooling an internal combustion or explosion engine, consisting in causing the water to flow in a closed spiral channel around the cylinder of the engine and through a helical channel arranged in the head of the engine to cause a proportional transference of heat from the engine cylinder to the water to uniformly cool the engine cylinder.

2. The method of cooling an internal combustion or explosion engine, consisting in causing water to flow in a helical pipe embedded in the head of the engine.

3. The method of cooling the exhaust valve seat of an internal combustion or explosion engine, consisting in causing the water to flow in a closed pipe embedded in and enclosing the valve seat.

4. An internal combustion or explosion engine provided with external cylinder vanes and a wall located outwardly of the vanes and contacting the same to establish a closed spiral water channel rising from the lower end of the engine cylinder to the upper end thereof and having a variable pitch.

5. An internal combustion or explosion engine having an engine cylinder formed with integral external vanes extending upwardly from the lower end of the cylinder to the upper end thereof and providing a spiral water channel around the cylinder, the vanes being arranged in a varying pitch from their lower end to their upper end, whereby the channel decreases in cross sectional area upwardly, and a wall enclosing said vanes to confine the flowage of water in said channel.

6. An internal combustion or explosion engine cylinder having integral external screw threads and means for causing the water to flow against said screw threads to cool the engine cylinder.

7. An internal combustion or explosion engine having a head provided with a helically coiled water circulating pipe encased in the head.

8. An internal combustion or explosion engine, having an exhaust valve seat and a water circulating pipe encased by the material forming said seat and having external inlet and outlet ends for maintaining water in circulation around said seat when coupled to an external water circuit.

9. An internal combustion or explosion engine having a cylinder and a water jacket wall surrounding the cylinder, and means between the cylinder and the water jacket wall providing a spiral water channel therebetween of varying diameter.

10. An internal combustion or explosion engine having a cylinder and a head, spiral vanes arranged around the cylinder and integral therewith, a wall enclosing said vanes and having contacting engagement with the same to provide a spiral water channel between the vanes, and a helical water cooling pipe encased in the head and provided with communication with the upper end of the spiral channel.

11. An internal combustion or explosion engine having a cylinder provided with external vanes arranged around the same and a water jacket in forced physical contact with said vanes to support the cylinder against the transverse piston reaction developed against the wall of the cylinder, said external vanes providing a helical water cooling channel of varying pitch.

12. An internal combustion engine having a cylinder and a water jacket enclosing the cylinder, the cylinder being formed with fine external ribs and the water jacket being formed with helical vanes having pressure contact with said ribs.

13. The method of cooling internal combustion engines consisting in causing a cooling fluid to circulate around the engine cylinder in a helical path of varying pitch to cause the fluid to uniformly cool the engine cylinder.

14. The method of cooling an internal combustion engine, consisting in causing water to circulate around the engine cylinder in a helical path whose channel diameter varies proportionate to the intensity of heat generated in the engine cylinder.

AUGUSTE LOUIS MARIE ANTOINE ROUY.

REFERENCES CITED

The following references are of record in the file of this patent:

UNITED STATES PATENTS

| Number | Name | Date |
| --- | --- | --- |
| 730,345 | Coburn | June 9, 1903 |
| 1,279,008 | Ross | Sept. 17, 1918 |
| 2,146,368 | Dake | Feb. 7, 1939 |
| 2,332,618 | Wagner et al. | Oct. 26, 1943 |
| 1,634,768 | Bonner | July 5, 1927 |
| 772,178 | Reaugh | Oct. 11, 1904 |
| 2,231,295 | Price | Feb. 11, 1941 |
| 843,068 | Brady | Feb. 5, 1907 |
| 1,437,904 | Moomaw | Dec. 5, 1922 |

FOREIGN PATENTS

| Number | Country | Date |
| --- | --- | --- |
| 191,774 | British | 1923 |
| 195,042 | British | 1924 |